April 30, 1963  J. H. POTTS, JR  3,087,697

PARACHUTE PACK AND PACK OPENER

Filed Sept. 20, 1961

INVENTOR.
JAMES H. POTTS, JR.

BY

ATTYS.

AGENT.

United States Patent Office 3,087,697
Patented Apr. 30, 1963

---

3,087,697
PARACHUTE PACK AND PACK OPENER
James H. Potts, Jr., Silver Spring, Md., assignor to the United States of America as represented by the Secretary of the Navy
Filed Sept. 20, 1961, Ser. No. 140,175
7 Claims. (Cl. 244—149)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a parachute pack opener and more particularly to an explosively operated ball-lock parachute pack opening release mechanism which utilizes the explosive force of an explosive fitting to unlock the ball-lock mechanism, to hurl the pack opener components apart and to deploy the parachute with great speed.

In the field of aerial laid mines, torpedoes, rescue equipment and the like, utilizing a parachute therewith, it has been the general practice to provide the parachute with one of two principle opening mechanisms. One such mechanism utilizes a spring to effect the separation or opening of the parachute pack; the spring being compressed and locked in place by a ball-lock which is unlocked by an explosive fitting. Since the spring force is a function of the space in which the spring can be compressed, this pack opener can provide a very limited separation force for the parachute pack components. A second type parachute pack opening mechanism has utilized an explosive force to shear rivets which secure a parachute pack together. Since these rivets necessarily are small, they are susceptible to damage and once installed do not allow for stock pile inspection of the parachute pack and pack opener components and replacement of the nylon shroud lines which deteriorate with time.

The general purpose of this invention is to provide a pressure pack opener having sufficient force to open the parachute pack and deploy the parachute with great speed, yet allowing for stock pile inspection and replacement of deteriorated nylon shroud lines. To attain this, the present invention contemplates a unique pack opener consisting of a sleeve and stem which are locked together by a plurality of balls. These balls are held in a locked position by a plunger secured to a piston that is held against a step within the sleeve by a frangible disc locked in position at the other end of the plunger. Adjacent the face of the piston is an explosive, detonation of which forces the plunger through the disc to unlock the balls. The piston is held in place by the ragged edges of the ruptured disc and the expanding gases of the explosive. The back pressure of the gas acting on the sleeve applies a component of force to the balls, forcing the balls into a radial groove in the piston plunger. This translation of the balls releases the sleeve from the stem so that the gas pressure in the closed chamber between the piston head and the explosive fitting can hurl the sleeve and the attached pack components apart. The parachute is attached to the sleeve by an attachment line and therefore carried by the sleeve as it separates from the stem resulting in instantaneous deployment of the parachute. The attachment line is subsequently severed thereby separating the pack opener sleeve and its associated parts from the parachute after deployment.

It is, therefore, an object of the present invention to provide a parachute pack opener which insures positive opening of the parachute pack and rapid deployment of a parachute.

Another object is to provide a parachute pack opener which does not rely on a spring to effect separation of the pack parts.

A further object of the invention is the provision of a parachute pack opener which does not utilize rivets to secure the separable pack opener parts together.

Still another object is to provide a parachute pack opener which allows subsequent disassembly for inspection of the pack opener components and replacement of the nylon shroud lines.

Other objects and many of the attendant advantages of this invention will be more readily appreciated as the same becomes better understood by reference to the following detailed description when considered in connection with the accompanying drawing in which like reference numerals designate like parts throughout the figures thereof and wherein.

Figure 1:
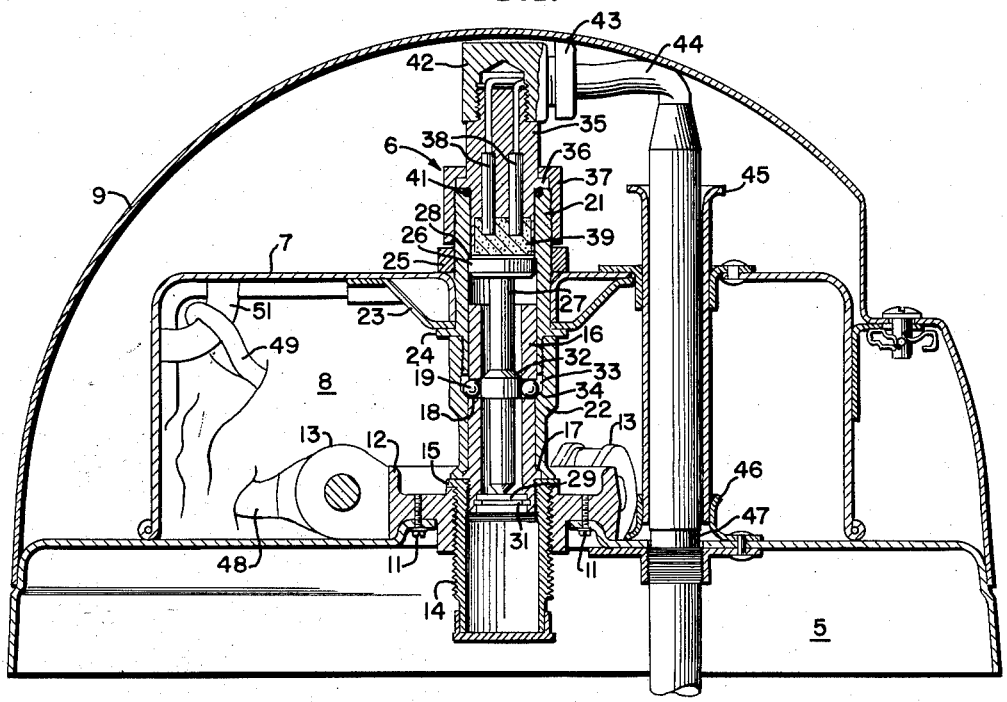
FIG. 1 is a sectional view of a parachute pack and pack opener embodying the instant invention secured to the body of a mine, torpedo or other air-dropped container, before actuation of the pack opener.

Referring now to the drawing and more particularly to FIG. 1 thereof, there is illustrated a portion of the outer casing 5 of a mine, bomb, torpedo or the like, or which may be the outer casing of a container containing rescue equipment 9, electronic gear or any other supply that is to be air dropped. Secured to the outer casing 5 by the parachute pack opener, generally indicated by the reference numeral 6, is a parachute housing 7 within which is contained a parachute 8. Secured to the parachute housing 7 may be an outer cover 9 designed in such a manner as to enhance the aerodynamic characteristics of the device, but which may, if desired, be omitted.

Secured to the outer casing 5 by means of a plurality of screws 11 is a shroud line adapter 12 having a plurality of radially spaced shroud line securing means 13 thereon. Retaining member 14 is threaded within the shroud line adapter 12 until flange 15 abuts the adapter for reasons which will become more readily apparent as the description proceeds. Stem 16 is threaded within the retaining member until step 17 thereon abuts the flange 15. Stem 16 is a hollow cylinder having four quadrately spaced apertures 18 within each of which is contained a steel ball 19.

The sleeve assembly has an upper section 21 threaded into a lower section 22, the upper section being secured to the parachute housing bracket 23 by flange 24 and nut 25. Contained within the upper section 21 of the sleeve assembly and inserted for transitional movement therein, is a piston 26 having a plunger 27 extending into the hollow cylindrical stem 16. The upper surface of piston 26 is held against a step 28 within the upper section of the sleeve assembly 21 by a frangible disc 29 abutting the piston plunger 27, the disc being held in place by a retaining ring 31 secured within in a groove in the lower sleeve assembly section 22. In this position the expanded portion 32 of plunger 27 retains the balls 19 within the recess 33 and against the beveled portion 34 of sleeve section 22 to lock the sleeve assembly and the stem 16 together.

An explosive fitting 35 having a flange 36 thereon abuts and extends within the upper sleeve section 21 and is secured thereto by a cap 37 threaded to the upper section 21 and engaging the flange 36. The explosive fitting contains a plurality of time delayed, electrically fired detonating caps 38 and an explosive 39 closely adjacent the upper surface of piston 26. The explosive fitting may, if desired, be sealed within the upper sleeve section 21 by any suitable means, such, for example, as the pressure seal 41 illustrated. A cable adapter 42 is threaded to the explosive fitting 35 and is adapted to receive a fitting 43 on cable 44 to complete the necessary electrical connection from the cable 44 to the detonating caps 37. Cable 44 is run through a tubular bracket 45 extending through the parachute housing 7 and is frictionally held in place by a receiving means 46 secured to the outer casing 5. A quick opening, pull-type connection is made in the cable 44 at the outer casing 5 by any suitable connecting means 47 and the electrical circuit is completed to any suitable electrical firing device contained within the outer casing 5.

The shroud lines 48 of parachute 8 are secured to the shroud line securing means 13 on adapter 12 and a parachute attachment line 49 is secured at one end to the crown of the parachute and at the other end to the bracket 51 in the parachute housing 7.

In operation of the device, the parachute 8 is packed within the parachute housing 7, the shroud lines 48 are attached to the securing means 13 and the pack opener 6 is assembled in the condition illustrated in FIG. 1. As the bomb, mine or torpedo is released from the aircraft, an electrical signal is supplied through cable 44 to the time delay detonating caps 38. The detonating caps allow sufficient time for the device to clear the aircraft and then detonates the explosive 39 the gases of which act against the head of piston 26, forcing the point of piston plunger 27 through the frangible disc 29, the travel of the piston 26 being limited by the abutment of the lower face of piston 26 against the stem 16. The piston 26 is locked in this position by the ragged edges of the now ruptured disc 29 and the still expanding gases of the explosive 39. The back pressure exerted by the expanding gases on the explosive fitting 35 tends to drive the sleeve assembly attached thereto outwardly, the beveled portion 34 of the lower sleeve section 22 applying a component of force on the balls 19 tending to move these balls inwardly. The translation of piston 26 has removed the expanded portion 32 of plunger 27 from its position abutting balls 19 and the component of force applied thereto by the bevel 34 forces balls 19 into the recess formed by the piston plunger 27. This movement of balls 19 unlocks the sleeve assembly from the stem 16 allowing the sleeve assembly to slide thereon. The expanding gases in the closed chamber between the piston 26 and the explosive fitting 35 hurl the sleeve and the parachute housing attached thereto apart, carrying with it the parachute attachment line 49 attached to bracket 51 and to parachute 8. As is apparent, the action of the explosive 39 within this chamber not only opens the parachute pack but also rapidly deploys the parachute 8.

The flange 15 on retaining member 14 bearing against the shroud line adapter 12 and the step 17 on stem 16 bearing against flange 15 transfer the force created by the expanding gases acting on the face of piston 26 to the outer casing 5 and prevents any failure to the threads securing these members together.

Figure 2:
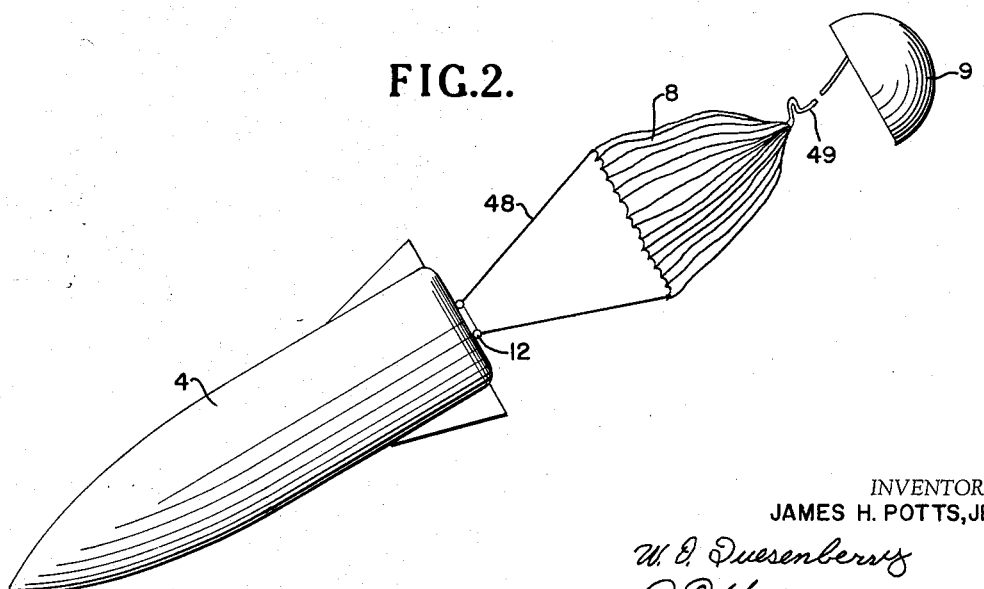
FIG. 2 is a pictorial view of a bomb in flight having a parachute attached thereto after actuation of the pack opener and subsequent deployment of the parachute.

Referring now to FIG. 2 there is illustrated a bomb 4 in flight shortly after being released from an aircraft. The explosive pack opener has been fired and has separated the parachute housing and outer cover 9 from the bomb 4 and has acted to partially deploy the parachute 8. The drag created by the dome-shaped outer cover 9 is greater than the drag created by the partially deployed parachute 8, this difference being sufficient to part the parachute attachment line 49 thereby releasing the outer cover 9 and the parachute housing and sleeve assembly attached thereto from the parachute 8. The parachute 8 secured by shroud lines 48 to the shroud line adapter 12 attached to the outer casing 5 of the bomb 4 continues to deploy and lowers the bomb to the surface in the manner well known to those skilled in the art.

It will be apparent to those skilled in the art that the device herein illustrated and described may be used alone or, if desired, may be used as a pilot parachute to later deploy a larger parachute or to suspend a tail fairing housing with a larger parachute in the manner well known to those skilled in the art. It is further apparent that the device illustrated and described herein may be readily disassembled for inspection of the pack opener parts and for replacement of the nylon shroud lines if deterioration so requires. The explosive contained within the explosive fitting, is utilized not only to unlock the ball-lock mechanism and to separate the parachute pack components, but also to insure complete and rapid deployment of the parachute contained therein.

Obviously many modifications and variations are possible in light of the above teachings. It is, therefore, to be understood that within the scope of the appended claims, the invention may be practiced otherwise than as specifically described.

What is claimed as new and desired to be secured by Letters Patent of the United States is:

1. A parachute pack opener comprising a hollow cylindrical stem having a plurality of apertures therein, a sleeve having a recess therein fitted about said stem for translatory movement thereon, a plurality of balls, each of said balls being disposed respectively within one of said apertures, means within said stem abutting said balls for locking said balls in the recess of said sleeve to prevent translatory movement thereof, an explosive detonating means, and an explosive within said sleeve adjacent to said locking means, whereby when said explosive is detonated said locking means releases said balls and unlocks said sleeve and said sleeve is driven from said stem by the detonation of the explosive, said locking means comprising a piston within said sleeve, a plunger contiguously formed with said piston and extending into said stem, an expanded portion on said plunger, frangible means secured within said stem and abutting said plunger to maintain said piston adjacent said explosive such that said expanded portion on said plunger is aligned with the apertures in said stem whereby said balls are locked within the apertures until said explosive is detonated, said frangible means comprising a disc, a retaining ring engaging said stem and said disc to secure said disc within said stem so that said disc locks the piston to prevent movement thereof whereby when said explosive is detonated said plunger is driven through said disc, said disc holding said plunger after said plunger has been driven therethrough to prevent further movement of said piston.

2. The parachute pack opener of claim 1 further comprising a parachute housing attached to said sleeve, a device to be air dropped, a shroud line adapter and retaining member securing said stem to said device, a parachute having a crown portion packed within said housing and scured to said stem by said shroud line adapter and retaining member so that the parachute is completely enclosed by said device and said housing and suspending said device therefrom when said parachute is deployed whereby when said explosive is detonated said housing is removed from about said parachute by said explosive to allow said parachute to deploy.

3. The combination of claim 2 wherein the crown portion of said parachute is detachably secured to said housing whereby when said housing is removed said parachute is forcibly deployed by the movement of said housing.

4. In combination, a device to be air dropped, a parachute pack removably secured to said device, said parachute pack comprising a stem secured to said device, a sleeve having a recess therein fitted about said stem for translatory movement thereon, means locking said sleeve on said stem to prevent premature translatory movement of said sleeve, a housing secured to said sleeve, a parachute packed within said housing and detachably secured thereto, a shroud line adapter and retaining ring connected to said stem and said parachute securing said parachute to said device in such manner that the parachute is completely enclosed by said device and said housing and suspending said device when said parachute is deployed, an explosive detonating means, and an explosive secured to said sleeve adjacent said first named means whereby when said explosive is detonated said first named means unlocks said sleeve and said sleeve is driven off said stem with sufficient force to deploy said parachute, said first named means comprising a plurality of balls normally engaging said stem and said recess of said sleeve, a piston within said sleeve, a plunger contiguously formed with said piston, an expanded portion on said plunger, said expanded portion normally engaging said balls to lock said balls in said recess whereby when said explosive is detonated said piston is translated within said sleeve to disengage said expanded portion from locking engagement with said balls and unlock said sleeve, said sleeve being driven off said stem by the detonation of said explosive to remove said housing from about said parachute and deploy said parachute, a frangible disc secured within said stem by a retaining ring, said disc abutting said plunger to maintain said expanded portion of said plunger in locking engagement with said balls and said piston adjacent said explosive until said explosive is detonated, said plunger being driven through said disc to a moved position when said explosive is detonated and thereafter securing said plunger in said moved position.

5. A parachute pack opener comprising a hollow cylindrical stem having a plurality of circumferentially spaced apertures therein, a hollow cylindrical sleeve fitted about said stem for translatory movement thereon, said sleeve having a recess therein, a movable piston within said sleeve, a plunger secured to said piston and extending into said stem, an expanded portion on said plunger, a plurality of steel balls, each disposed within a respective aperture in said stem, a frangible disc secured to said stem by a retaining ring, said frangible disc abutting said plunger to maintain said expanded portion adjacent the apertures in said stem, said expanded portion abutting said steel balls and locking said balls within the recess in said sleeve to prevent premature translatory movement of said sleeve on said stem, an explosive detonating means, an explosive, and means securing said explosive within said sleeve adjacent said piston whereby when said explosive is detonated said piston is moved within said sleeve and said plunger is driven through said disc to remove said expanded portion from its abutting relation with said balls to allow said balls to be forced into said stem and release said sleeve and said sleeve is forcibly driven from said stem by detonation of said explosive, a device to be air dropped, means of securing said stem to said device, a parachute housing secured to said sleeve, a parachute having a crown portion packed within said housing, said last-named means comprising a shroud line adapter and retaining member secured to said stem so that said parachute is completely enclosed by said device and said housing and connecting said parachute to said stem to suspend said stem therefrom when said parachute is deployed, and means detachably securing the crown portion of said parachute to said housing whereby when said explosive is detonated said housing is ejected by said explosive thereby forcibly deploying said parachute.

6. The combination of claim 5 wherein said last named means is an attachment line connected to the crown portion of said parachute and to said housing, said attachment line being of sufficient strength to maintain said parachute attached to said housing during deployment thereof, but of insufficient strength to maintain the connection after deployment.

7. The combination of claim 6 wherein said means securing said explosive within said sleeve comprises an explosive fitting having a flange thereon, a cap threaded to said sleeve and securing the flange of said fitting against said sleeve, a pair of time delay electrically fired detonating caps secured within said fitting, an electrical cable, and electrical cable receiving means on said fitting to provide an external electrical connection from said caps to said electrical cable, said cable running through a tubular bracket extending through the parachute housing, and a pull type connection detachably securing said cable to said device whereby when the housing is ejected the pull-type connection is detached and the cable is separated from the device.

References Cited in the file of this patent
UNITED STATES PATENTS 2,812,148    Fogal et al. _____ Nov. 5, 1957
3,010,752    Geffner _____ Nov. 28, 1961